(12) United States Patent
Siltanen

(10) Patent No.: US 6,533,006 B1
(45) Date of Patent: Mar. 18, 2003

(54) WINTER TIRE FOR VEHICLE, PARTICULARLY A TRACTION WINTER TIRE FOR HEAVY TRUCKS

(75) Inventor: Teppo Siltanen, Nokia (FI)

(73) Assignee: Nokian Tyres Plc., Nokia (FI)

( * ) Notice: Subject to any disclaimer, the term of this patent is extended or adjusted under 35 U.S.C. 154(b) by 32 days.

(21) Appl. No.: 09/675,381

(22) Filed: Sep. 29, 2000

(30) Foreign Application Priority Data

Sep. 29, 1999 (FI) .............................................. 19992096

(51) Int. Cl.[7] ........................ B60C 11/11; B60C 11/12; B60C 11/14; B60C 107/00
(52) U.S. Cl. .............................. 152/209.1; 152/209.18; 152/210; 152/902; 152/DIG. 3
(58) Field of Search ........................ 152/209.1, 209.18, 152/209.22, 902, DIG. 3, 210; D12/577, 578, 579, 580, 592–603

(56) References Cited

U.S. PATENT DOCUMENTS

| | | | |
|---|---|---|---|
| D64,462 S | * | 4/1924 | Kratz et al. |
| 3,707,177 A | * | 12/1972 | Boileau |
| 3,875,986 A | * | 4/1975 | Boileau |
| 3,971,424 A | | 7/1976 | Boileau |
| 3,986,545 A | * | 10/1976 | Montagne |
| 4,351,381 A | * | 9/1982 | Roberts et al. |
| 4,723,584 A | | 2/1988 | Yamaguchi et al. |
| 4,779,656 A | * | 10/1988 | Graas |
| 4,934,424 A | | 6/1990 | Kojima |
| 5,088,536 A | * | 2/1992 | Graas et al. |
| 5,256,221 A | * | 10/1993 | Trabandt |
| 5,388,625 A | | 2/1995 | White |
| 5,964,118 A | | 10/1999 | Kamata |
| 5,964,267 A | * | 10/1999 | Poque et al. |
| 6,250,354 B1 | * | 6/2001 | Kawai |

FOREIGN PATENT DOCUMENTS

| | | |
|---|---|---|
| DE | 34 42 300 A1 | 11/1984 |
| DE | 4416435 A1 | 2/1996 |
| EP | 0 681 930 A | 5/1995 |
| FI | 58281 | 12/1981 |
| JP | 59-45203 | * 3/1984 |
| JP | 11048717 | 2/1999 |

OTHER PUBLICATIONS

JP 3159804 Abstract, Japan Jul. 9, 1991.
DE 4416435A1 Abstract, Germany Nov. 15, 1995.

* cited by examiner

Primary Examiner—Steven D. Maki
(74) Attorney, Agent, or Firm—Klarquist Sparkman LLP

(57) ABSTRACT

The present invention relates to a traction winter tire with rows (A–F) of tread pattern blocks (11) and circumferential (a–e) grooves and transverse grooves (j–o) separating pattern blocks from each other, the tread pattern blocks comprising sipes (7, 8a, 8b, 9a, 9b) opening to the tread surface and extending into the tire for enhancing the grip of the tread with a road surface, said sipes being discontinued at support areas (13) operable to attach anti-skid studs (12). The winter tire is characterized in that the tread pattern blocks are displaced relative to one another such that overlapping and axially adjacent tread pattern blocks are connected in pairs into double tread pattern blocks (2) by a bridge part (3), and tread pattern blocks in the shoulder area of the tire are, alternatingly, a tread block of a double tread block and an unbound single tread block (11).

15 Claims, 2 Drawing Sheets

WINTER TIRE FOR VEHICLE, PARTICULARLY A TRACTION WINTER TIRE FOR HEAVY TRUCKS

RELATED APPLICATION DATA

This application claims priority to Finnish Application No. 19992096, filed Sep. 29, 1999.

BACKGROUND AND SUMMARY

The present invention concerns a winter tire for a vehicle, particularly a traction winter tire for heavy trucks, the tread of which is provided with tread pattern blocks and with mainly circumferential grooves separating said pattern blocks from each other and those in transvense direction thereto, the tread pattern block rows between which circumferential grooves are displaced relative to each other so that the adjacent tread pattern blocks in axial direction to the tire are overlapping, and which tread pattern blocks contain sipes opening into the tread and extending into the tire to increase the grip of the tread with the road surface. The purpose of the sipes provided in the tread pattern blocks is to increase the grip of the tires in winter conditions. In the Nordic countries, so-called snow tires provided with open patterns have been used for improving the grip of the tires in winter conditions, the surface-groove ratio whereof being small compared with ordinary traction tires.

A drawback related to said snow tires lies in that the amount of the sipes of the tread cannot be substantially increased without increasing the surface-groove ratio or without reducing the groove depth, both of which decrease the driving properties in snow conditions. If the amount of the sipes is increased and the surface-groove ratio and the groove depth are maintained, the stability of the tire will be impaired and its wear resistance will be degraded The objective of the present invention is to increase the amount of the sipes without altering the openness of the tread pattern and its groove depth.

The aim has been successfully achieved by means of a winter tire of the invention. The invention is based on the feature that the tread pattern blocks are joined in pairs mainly by an axial bridge part of the tire so that a double tread pattern block is formed comprising mainly an axial bridge zone and the ends (the wing parts) of both tread pattern blocks being joined. In a double tread pattern block of such configuration, at least one sipe of the length of the bridge zone can be formed in the bridge zone, and in addition, at least two sipes of the length of one tread pattern block in the wing parts of the double tread pattern block.

By means of the truck winter tire of the invention, provided with a double tread pattern block, an improved grip can be achieved on an icy and snowy road, that is, in conditions of packed slippery snow, while the wear resistance of the tire is excellent and the shape of the wear is uniform.

The tire of the invention works excellently without antiskid studs, though studs may also be attached thereon. The patterning of the tire enables an appropriate distribution of studs. An intact cylindrical support area of a tread pattern block is provided. When a stud is provided, the cylindrical support area surrounds the stud. A sipe entering the support area is discontinued on that spot, whereby a lamella used to form an intact sipe is replaced by lamella parts forming a discontinued sipe.

The tread of the tire of the invention may comprise a variable number of tread pattern block rows, adjacent tread pattern blocks being joined in pairs into double tread pattern blocks. A winter traction tire of a conventional-sized heavy truck is preferably provided with six rows of relatively small-sized tread pattern blocks, whereby three overlapping adjacent double tread pattern blocks are formed, or respectively, two double tread pattern blocks and two single tread pattern blocks, i.e. unbound blocks, in the shoulder areas.

If a tire includes an odd number of tread pattern block rows, for instance five or seven, adjacent overlapping double tread pattern blocks and one single tread pattern block are comprised in each axial row, alternately in one shoulder area and alternately in the other shoulder area. As regards the amount of sipes, this does not bear any significance.

Both the single tread pattern blocks in the shoulder area and a tread pattern block of the double tread pattern blocks in the shoulder area are advantageously rectangular (parallelogram) tread pattern blocks, the circumferential edges of which are parallel to the direction of rotation and the transversal edges of which are in axial direction to the tire. The tread pattern blocks of the middle area of the tread form advantageously a small angle with the tire axle so that the transversal edges thereof form an about 0 to 10° angle, preferably about 7°, to the axle, while the circumferential edges are parallel to the direction of rotation.

A double tread pattern block comprises preferably four short sipes, that is sipes, extending across each wing part of the tread pattern block, and one long sipe, extending across the bridge zone and, therefore, being longer by the length of the bridge part than the two short sipes together. The inner sipes of the wing parts are preferably positioned in the immediate proximity of the bridge zone. For reasons of manufacturing a tread pattern block, the side edges are curved inwards, which aids embedding the inner lamellac in the mould.

Since the spaces between the sipes in a double tread pattern block are advantageously mutually equal and since the inner sipes of the wing parts are located in the immediate proximity of the bridge zone, two sipe spaces form the width of the bridge part.

The tire of the invention and the tread thereof are manufactured in a manner obvious to a person skilled in the state of the art. The sipes a re achieved with lamellae of the shape corresponding to the shape of the sipes, which are embedded in the mould. The sipes are straight at the ends of the sipe in top view and Z-shaped or undulated in configuration in the portion of the sipe between the ends of the sipe.

The winter tire of the invention and the lamella used far manufacturing same are described below by an embodiment, reference being made to the accompanying figures, in which

DETAILED DESCRIPTION

Figure 1:
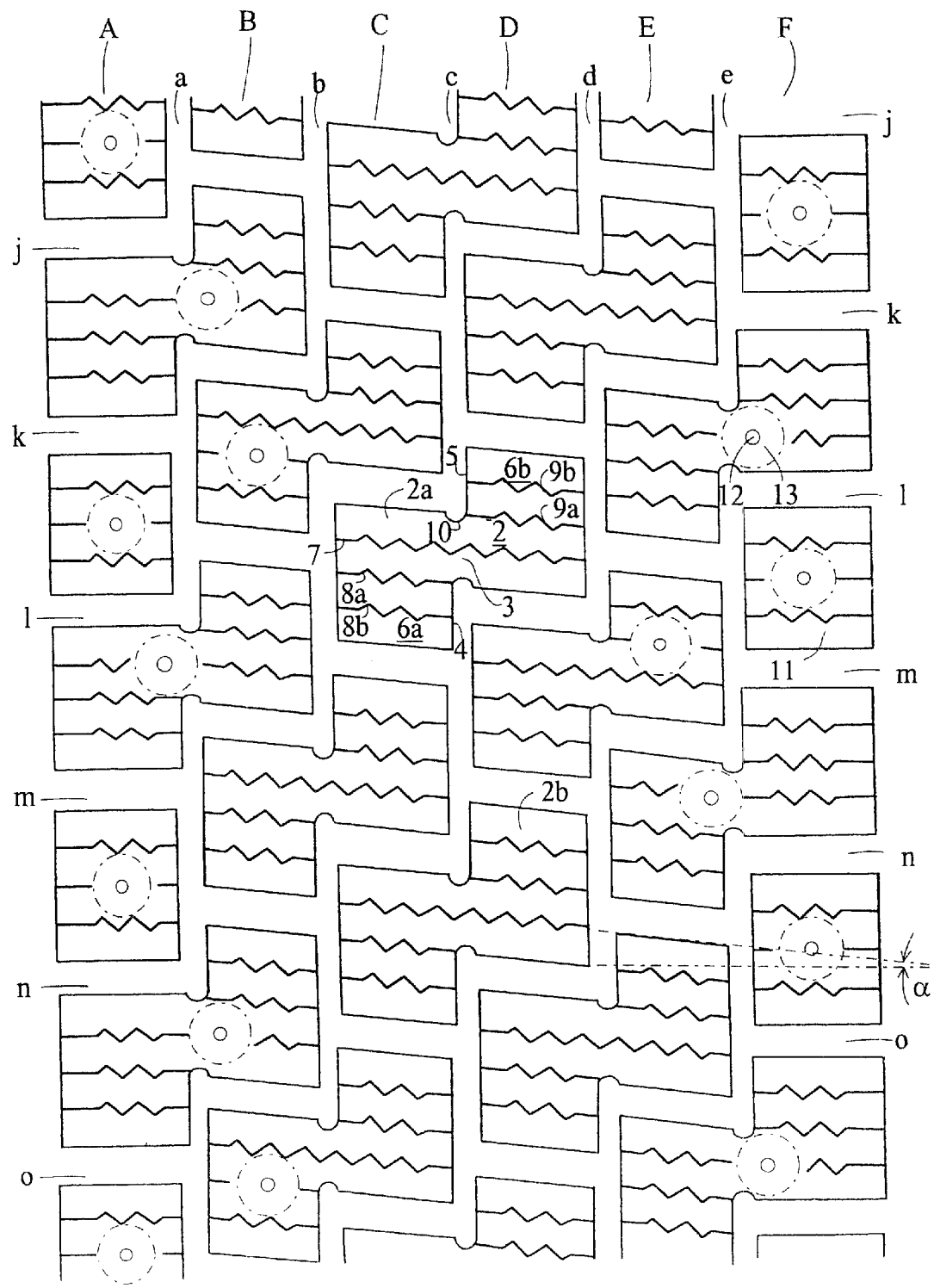
FIG. 1 presents the tread of a winter tire of the invention in top view.

FIG. 1 presents the tread 1 of a traction wheel for a heavy truck. The vertical direction of the figure is the same as the circumferential direction of the tire and the horizontal direction of the figure is the same as the axial direction of the tire. The tread is provided with six circumferential tread pattern block rows A–F, each outermost row A and F of which are located in the shoulder area of the tire. Between the circumferential tread pattern block rows A–F, circumferential grooves a–e are located. The adjacent tread pattern blocks, such as 2a and 2b, of two adjacent tread pattern block rows, such as C and D, are connected into a double tread pattern block 2. The connection is carried out by means of a bridge part 3, which connects the upper part of the internal edge 4 and the lower part of the other internal edge 5 of adjacent tread pattern blocks 2a and 2b. The length of the bridge part 3 is equivalent to the width of a circumferential groove c between the tread pattern blocks 2a and 2b to be connected. The bridge zone of the double tread pattern block 2 thus formed comprises the upper part of the one tread pattern block 2a and the lower part of the other tread pattern block 2b and the bridge part 3. The free parts of the tread pattern blocks 2a and 2b protrude from the bridge zone and form wing parts 6a and 6b in opposite directions.

There is room in the bridge zone for a both end opening sipe 7 extending across the entire zone, said groove being longer by the length of the bridge part 3 than the width of the tread pattern blocks 2a, 2b. Each of the wing parts 6a and 6b of the double tread pattern block 2 is provided with two both end opening sipes 8a, 9a and 8b, 9b, the inner sipes 8a and 9a whereof being located in the immediate proximity of the bridge zone 3. As is known in the art, the sipes extend from one edge of a tread pattern block to the other and open into adjacent grooves a–e. Most advantageously, the sipes are mutually parallel and parallel with the edges of the tread pattern block in axial direction to the tire. The sipes 7, 8a, 8b, 9a and 9b of the double tread pattern block 2 are located on the same distance from each other and preferably also on the same distance from the edges of the tread pattern block in the circumferential direction.

In the double tread pattern block 2 thus formed, the amount of sipes has been increased successfully while the surface—groove ratio, that is, the surface of tread pattern blocks in proportion to the circumferential grooves and the grooves transverse thereto is mainly unchanged. The distribution of sipes in the tread pattern block is advantageous and makes the tread stable.

The edges 10 of the bridge part 3 are inwards curved. This facilitates the embedding of lamellae used for forming the inner sipes 8a and 9a in the mould.

Owing to the configuration of a double tread pattern block 2, being primarily the shape of double L, the tread pattern blocks adjacent in axial direction to the tire are overlapping to each other, and the axial grooves j–o of the tread are stepped in shape. The double tread pattern blocks 2 are in circumferential direction preferably at a space from each other which corresponds to the space between the sipes. A regularly recurrent pattern is formed in this manner in the tread of the tire.

In the shoulder areas of the tire, areas A and F, there are alternately a pattern block 2a or 2b, respectively, of the shoulder area side of the double pattern block 2, and alternately, a single, i.e. an unbound tread pattern block 11. All tread pattern blocks of the shoulder areas A and F, both the bound tread pattern blocks 2a and the unbound tread pattern blocks 11 are preferably rectilinear in shape. All double tread pattern blocks of the middle area B–E of the tread are diamond-shaped so that the axial edges form a small angle α to the circumferential edges. The angle α is of the order 0°–10°, preferably 6°–7°. A minor slantedness causes noise suppression to the noise being generated.

The tread as in FIG. 1 is provided with cylindrical support areas 13 for anti-skid studs 12 being spread in the shoulder area A and F and in adjacent tread pattern block rows B and E. The spreading of the anti-skid studs is a positive solution and guarantees an efficient operation and uniform wear of studs if provided. The sipes may not extend to the support area 13. Therefore, all lamellae which form the sipes and which would extend to the support areas of the anti-skid studs, are discontinued so that they do not extend beyond the border of the support area.

Figure 2:
FIG. 2 presents approximately in one-to-one size a lamella used for producing the winter tire of the invention for making a sipe in a bridge zone, in top view and as seen when embedded in rubber mass.
Figure 3:
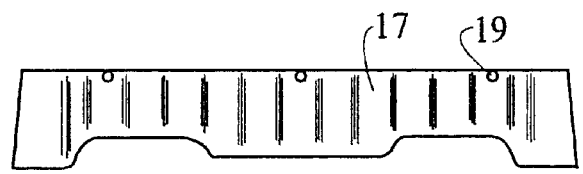
FIG. 3 presents the lamella of FIG. 2 in upright view and with the edge forming the tread turned up.

FIG. 3, a lamella 17 is presented for forming a sipe 7 extending across the bridge zone. The sipe shape formed by the lamella 17 in the tread is shown in FIG. 2. The upper edge of the lamella forms a sipe 7 visible in the tread. The serratedness of the opposite lower edge makes the tread pattern block solid. The holes 19 in the upper edge are venting holes.

Figure 4:
FIG. 4 presents approximately in one-to-one size a lamella used for producing the winter tire of the invention for forming a sipe of the wing part of a double tread pattern block, in top view and as seen when embedded in rubber mass.
Figure 5:
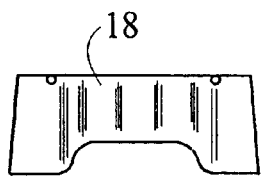
FIG. 5 presents lamella of FIG. 4 in upright view and what it would be like when disposed in a wing part in the middle of the tread.
Figure 6:
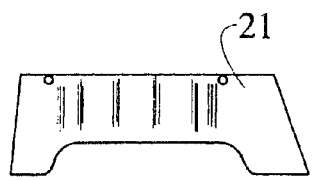
FIG. 6 presents lamella of FIG. 4 in upright view and what it would be like when disposed in a wing part located in a shoulder part of the tread.

FIG. 4 presents a lamella 18, 21 used for forming sipes of the unbound tread pattern blocks 11 and of the wing parts 2a, 2b of double tread pattern blocks. The sipe is shown to be identical in shape in said parts of the tread. The lamella 18, 21 is, however, modified in the manner determined by the location, as shown in FIGS. 5 and 6. The lamella 18 as in FIG. 5 is used for forming sipes of wing parts 2a, 2b of the middle area of the tread and the lamella 21 of FIG. 6 for forming sipes of both the unbound tread pattern blocks 11 and of the bound tread pattern blocks of the shoulder area, The manufacturing of lamellac, tire moulds and tires in moulds conforms to the conventional technology.

The embodiment displayed illustrates a six-row tire. It is obvious that the number of tread pattern blocks can be varied, as can the number, shape and mutual location of sipes and, however, maintain the idea of the invention. The dimensions of a tire define primarily the number of tread pattern block rows.

The tires of the invention are intended for use as traction wheels in heavy trucks, but it is obvious that they may also be used for less demanding needs. When worn out, they are useful for instance in summer driving.

What is claimed is:

1. A traction winter tire for heavy trucks having a tread being provided with circumferential rows of tread pattern blocks, and mainly circumferential grooves and transverse grooves separating said pattern blocks from each other, the circumferential rows of tread pattern blocks being displaced relative to each other so that the tread pattern blocks adjacent in an axial direction of the tire are overlapping, each of said tread pattern blocks comprising both end opening sipes opening to the tread surface and extending into the tire for enhancing the grip of the tread with a road surface, wherein the overlapping and axially adjacent tread pattern blocks are connected in pairs into double tread pattern blocks by a bridge part connecting one end of a side edge of one tread pattern block and the opposed end of an adjacent side edge of the other tread pattern block with each other to form a bridge zone and wing parts, the double tread pattern blocks adjacent each other in circumferential direction being overlapping in the axial direction, wherein a shoulder area of the tire comprises, alternatingly, a tread pattern block of a double tread pattern block and an unbound single tread pattern block, the wing parts of the double tread pattern blocks being formed from the connected tread pattern blocks and extending in opposite directions from the bridge zone, the double tread pattern blocks each comprising a both end opening long sipe extending from one circumferential outer edge thereof to the opposite outer edge thereof, at least one long sipe being discontinued adjacent a support area for an anti-skid stud.

2. A traction winter tire according to claim 1, wherein both wing parts of a double tread pattern block are provided with sipes.

3. A traction winter tire according to claim 1, wherein both wing parts of a double tread pattern block are provided with sipes which extend from one outer edge of a wing part to its opposite outer edge.

4. A traction winter tire according to claim 1, wherein both wing parts of a double tread pattern block are provided with sipes and the space between all adjacent sipes is equal.

5. A traction winter tire according to claim 1, wherein a sipe situated next to the long sipe in both wing parts of a double tread pattern block is located in the immediate proximity of the bridge zone.

6. A traction winter tire according to claim 1, wherein outer edges of the bridge part between the tread pattern blocks of the double tread pattern block are curved inwards.

7. A traction winter tire according to claim 1, wherein the double tread pattern block is symmetrical relative to the longitudinal centreline of the bridge zone.

8. A traction winter tire according to claim 1, wherein the sipes are mutually identical in shape and the sipes are straight at the ends of the sipe in top view and Z-shaped or undulated in configuration in the portion of the sipe between the ends of the sipe.

9. A traction winter tire according to claim 1, wherein the sipes are parallel to each other and to the longitudinal direction of the bridge zone of the double tread pattern blocks.

10. A traction winter tire according to claim 1, wherein the sipes and parallel edges of the double tread pattern blocks form a small angle ($\alpha$) with the axis of the tire, the angle being in the range 0° to 10°.

11. A traction winter tire for heavy trucks having a tread being provided with circumferential rows of tread pattern blocks, and mainly circumferential grooves and transverse grooves separating said pattern blocks from each other, the circumferential rows of tread pattern blocks being displaced relative to each other so that the tread pattern blocks adjacent in an axial direction of the tire are overlapping, each of said tread pattern blocks comprising sipes opening to the tread surface and extending into the tire for enhancing the grip of the tread with a road surface, wherein the overlapping and axially adjacent parallelogram tread pattern blocks are connected in pairs into double tread pattern blocks by a bridge part connecting one end of a side edge of one tread pattern block and the opposed end of an adjacent side edge of the other tread pattern block with each other to form a bridge zone and wing parts, the double tread pattern blocks adjacent each other in circumferential direction being overlapping in the axial direction, wherein a shoulder area of the tire comprises, alternatingly, a parallelogram tread pattern block of a double tread pattern block and an unbound single rectangular tread pattern block, the wing parts of the double tread pattern blocks being formed from the connected tread pattern blocks and extending in opposite directions from the bridge zone.

12. The traction winter tire of claim 11, wherein the sipes extend in an axial direction of the tire.

13. The traction winter tire of claim 11 wherein parallel edges of the develop tread pattern blocks form a small angle ($\alpha$) with the axis of the tire, the angle being in the range 0° to 10°.

14. The traction winter tire of claim 11, wherein at least three sipes are provided within each tread pattern block.

15. The traction winter tire of claim 11, wherein the sipes of the tread pattern blocks discontinue at support areas on the tread pattern blocks to which anti-skid studs can be attached.

* * * * *

UNITED STATES PATENT AND TRADEMARK OFFICE
CERTIFICATE OF CORRECTION

PATENT NO. : 6,533,006 B1
DATED : March 18, 2003
INVENTOR(S) : Teppo Siltanen

It is certified that error appears in the above-identified patent and that said Letters Patent is hereby corrected as shown below:

Column 1,
Line 15, "transvense" should read -- transverse --.

Column 2,
Line 44, "a re" should read -- are --.
Line 49, "far" should read -- for --.

Signed and Sealed this

Sixth Day of January, 2004

JAMES E. ROGAN
*Director of the United States Patent and Trademark Office*